United States Patent [19]

Harada et al.

[11] Patent Number: 4,835,600

[45] Date of Patent: May 30, 1989

[54] SOLID STATE IMAGE READING DEVICE WITH SENSORS ADHERED TO PLATE WHICH IS ADHERED TO LENS HOLDING MEMBER

[75] Inventors: Kiyoshi Harada; Motokazu Ikeda; Makoto Kon; Masahiko Matsunawa; Shizuo Morita; Yoshiyuki Ichihara, all of Hachioji, Japan

[73] Assignee: Konishiroku Photo Industry Co., Ltd., Tokyo, Japan

[21] Appl. No.: 72,023

[22] Filed: Jul. 10, 1987

[30] Foreign Application Priority Data

Jul. 21, 1986 [JP] Japan ............................... 61-172521
Jul. 21, 1986 [JP] Japan ............................... 61-172522
Sep. 9, 1986 [JP] Japan ............................... 61-213230

[51] Int. Cl.$^4$ ...................... H04N 9/093; H04N 9/097
[52] U.S. Cl. .......................................... 358/51; 358/55
[58] Field of Search ..................... 358/51, 55, 225, 229

[56] References Cited

U.S. PATENT DOCUMENTS 4,134,129 1/1979 Filipovich ............................ 358/55
4,591,901 5/1986 Andrevski ........................... 358/50

FOREIGN PATENT DOCUMENTS 15457 1/1986 Japan .
74444 4/1986 Japan .
74445 4/1986 Japan .
101163 5/1986 Japan .
118707 6/1986 Japan .

Primary Examiner—James J. Groody
Assistant Examiner—Robert M. Bauer
Attorney, Agent, or Firm—Jordan B. Bierman

[57] ABSTRACT

An image reading device for reading an image by a solid-state image reading elements (CCDs) being disposed at the image forming point of an optical unit which is integrated with at least an image forming lens, dichroic mirror for separating the color image into plural color components and unit construction parts such as a base, fixing plates, and lens barrel. The image reading elements are fixed to a lens holding member with an attaching plate by using adhesive. The attaching plate has a position adjusting mechanism.

9 Claims, 14 Drawing Sheets

FIG. 2-A
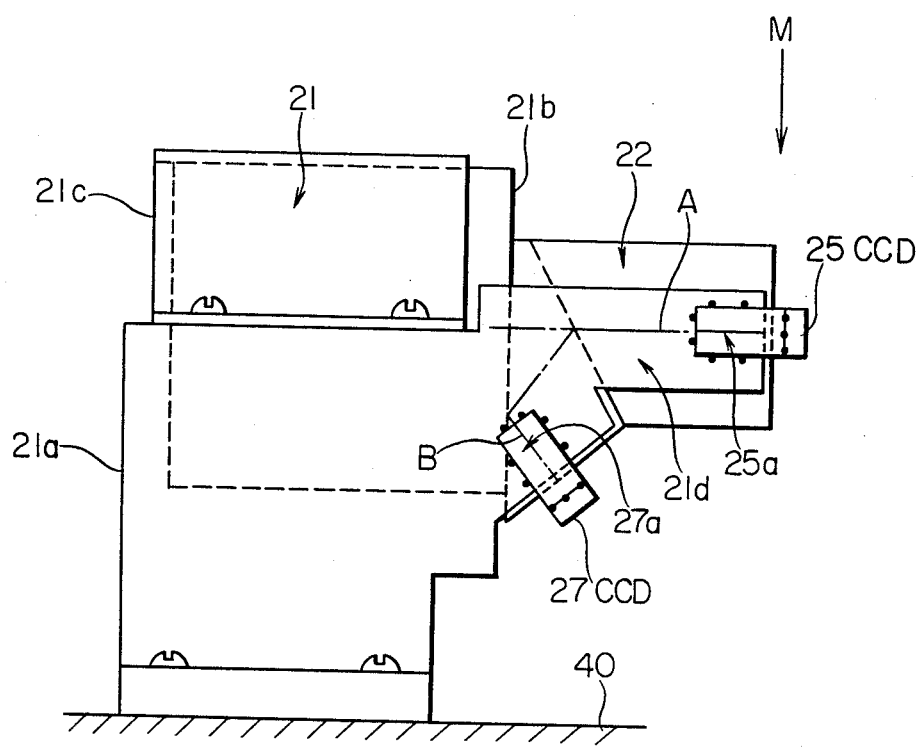
FIG. 2-B
VIEW FROM M
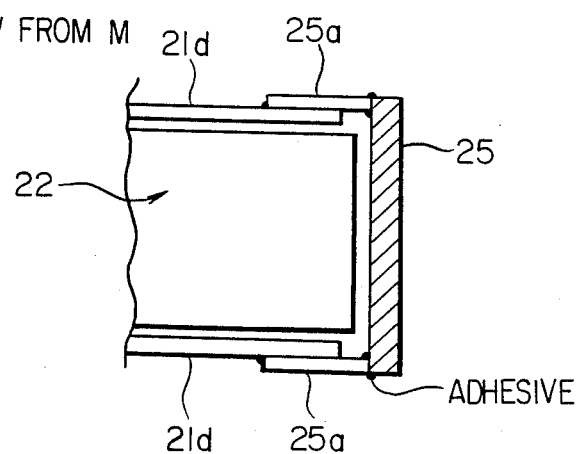

FIG. 3-A
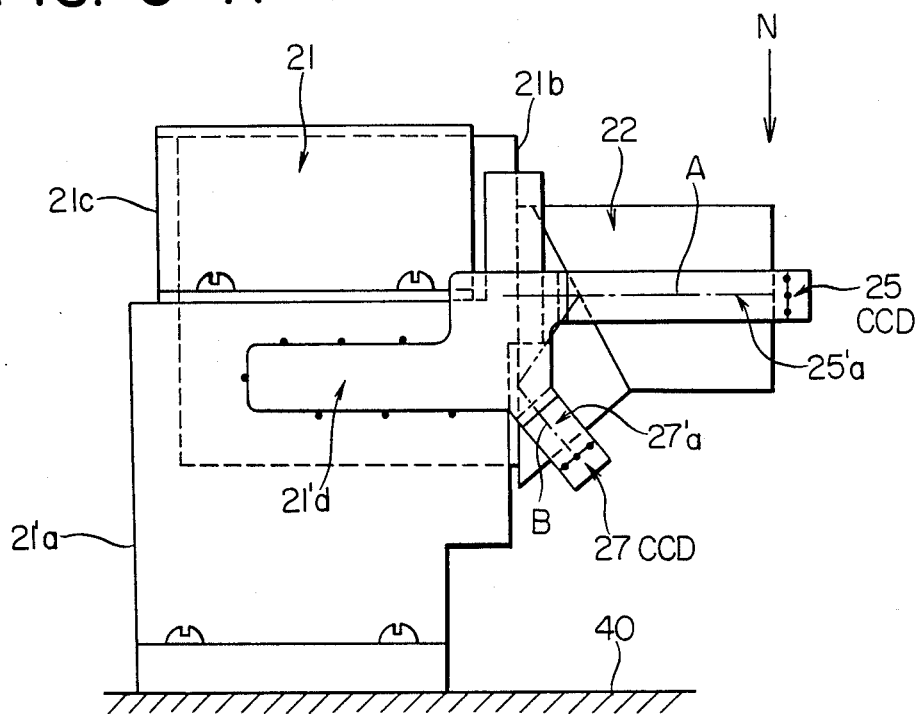
FIG. 3-B
VIEW FROM N
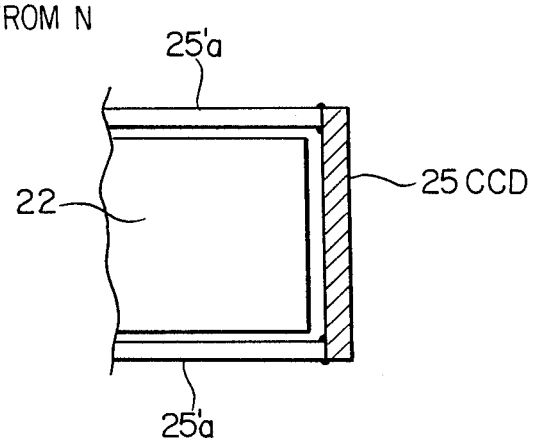

FIG. 4-A
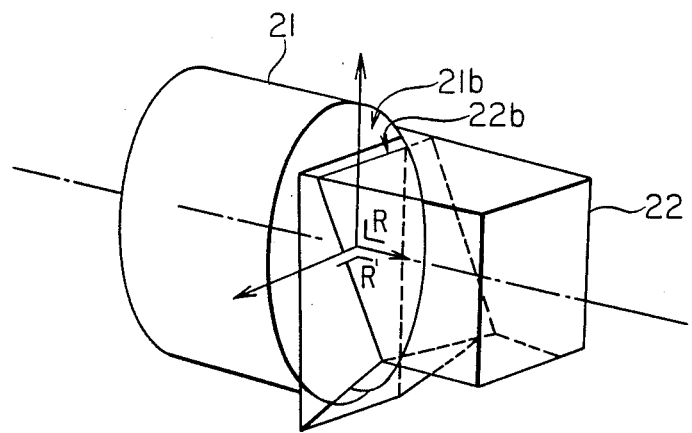
FIG. 4-B
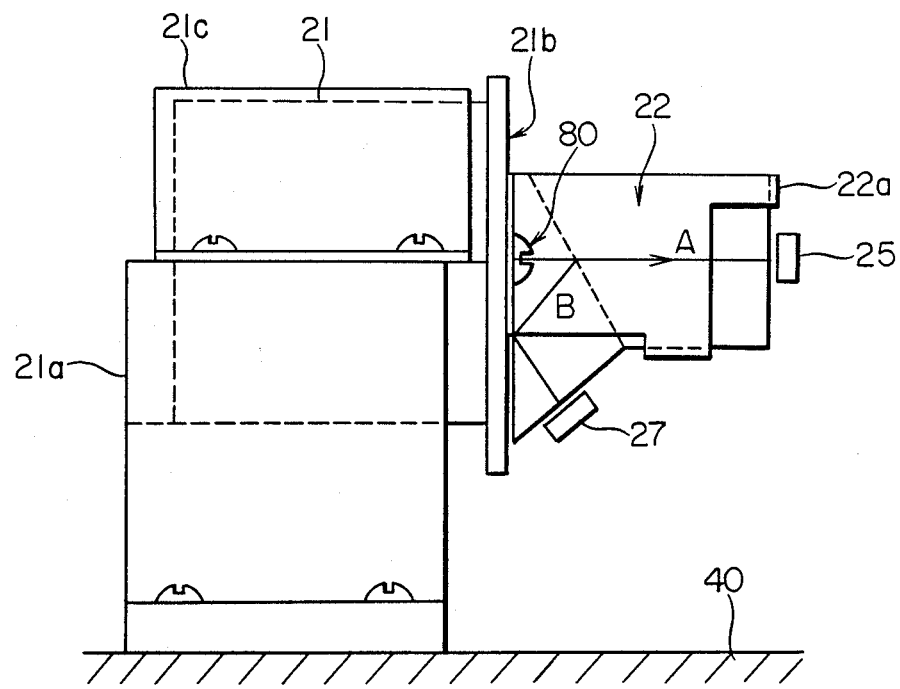

FIG. 6-A
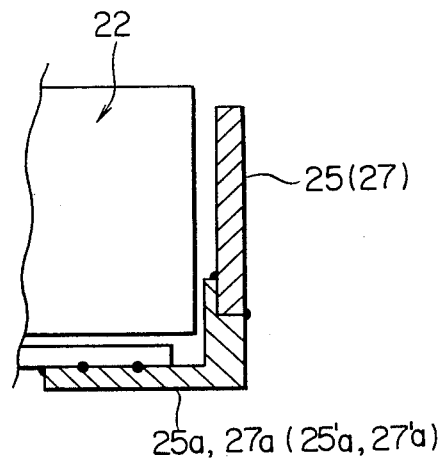
FIG. 6-B
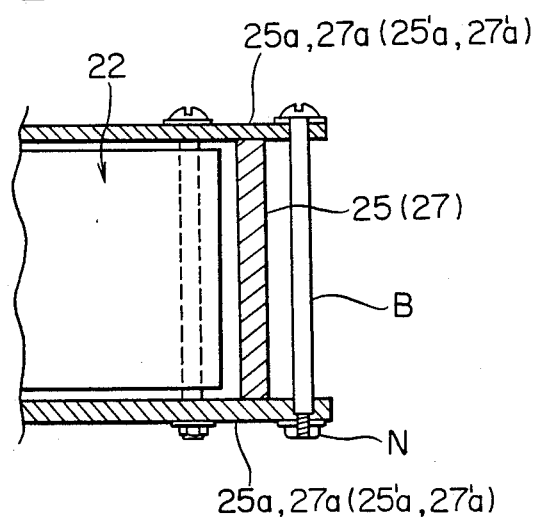

FIG. 9-A
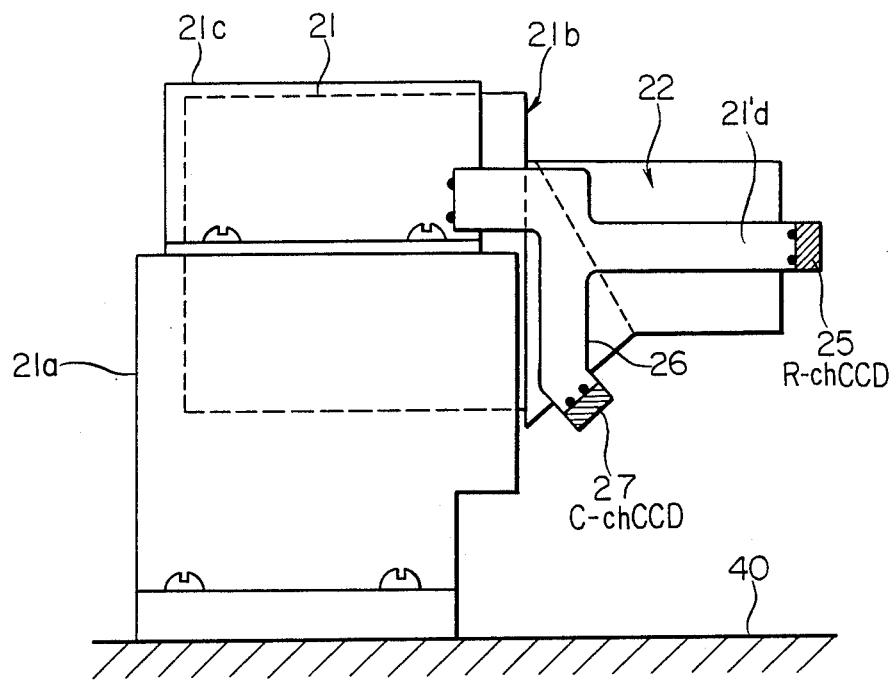
FIG. 9-B
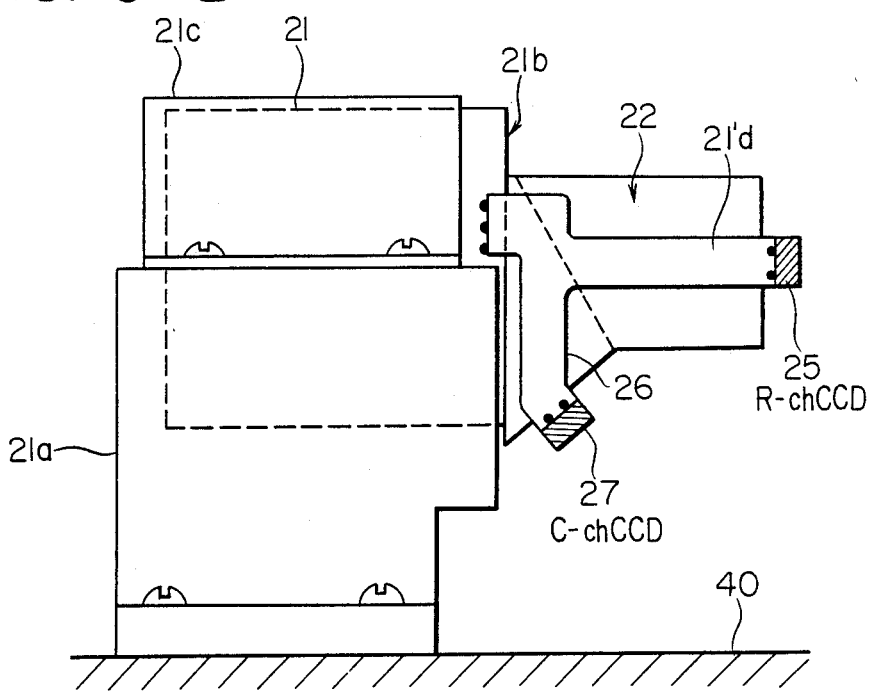

FIG. 9-C
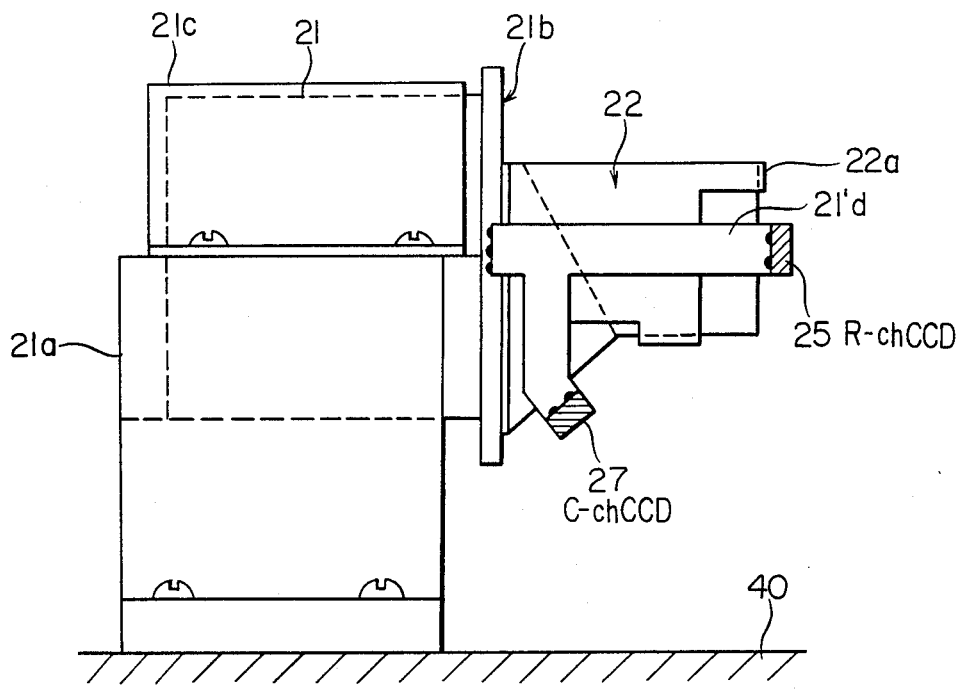
FIG. 9-D
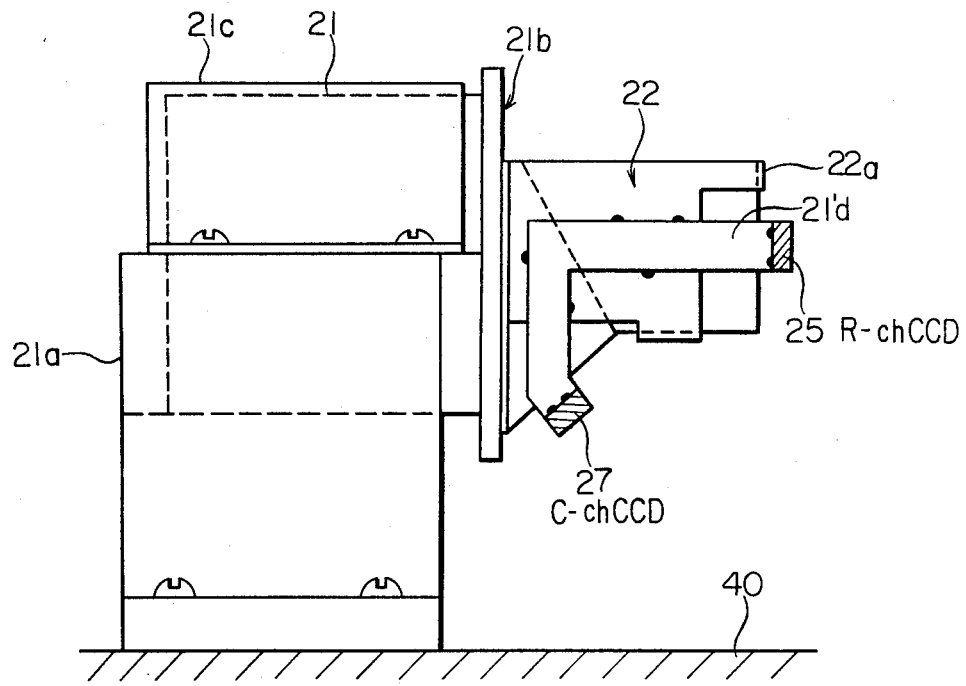

FIG. 10-A
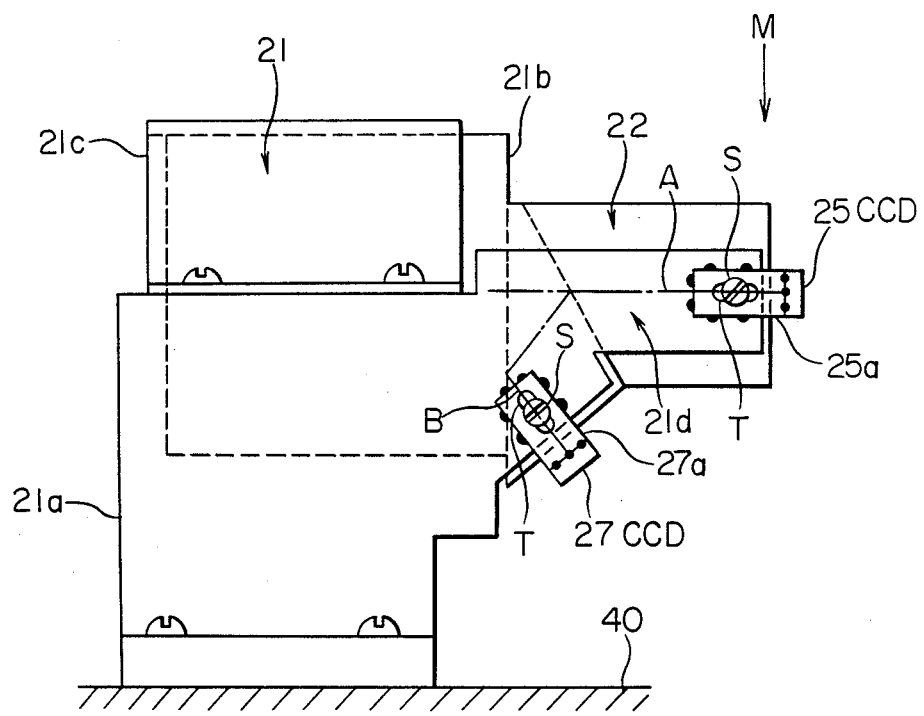
FIG. 10-B
VIEW FROM M
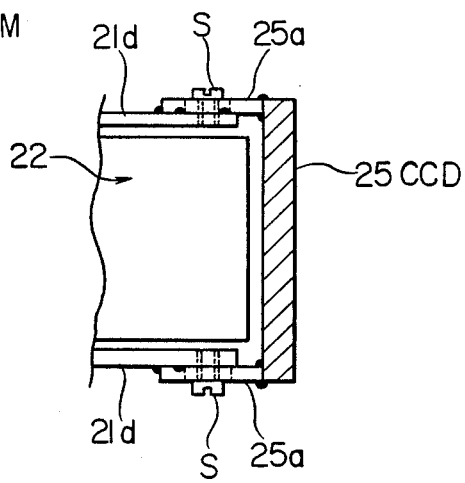

FIG. 11-A
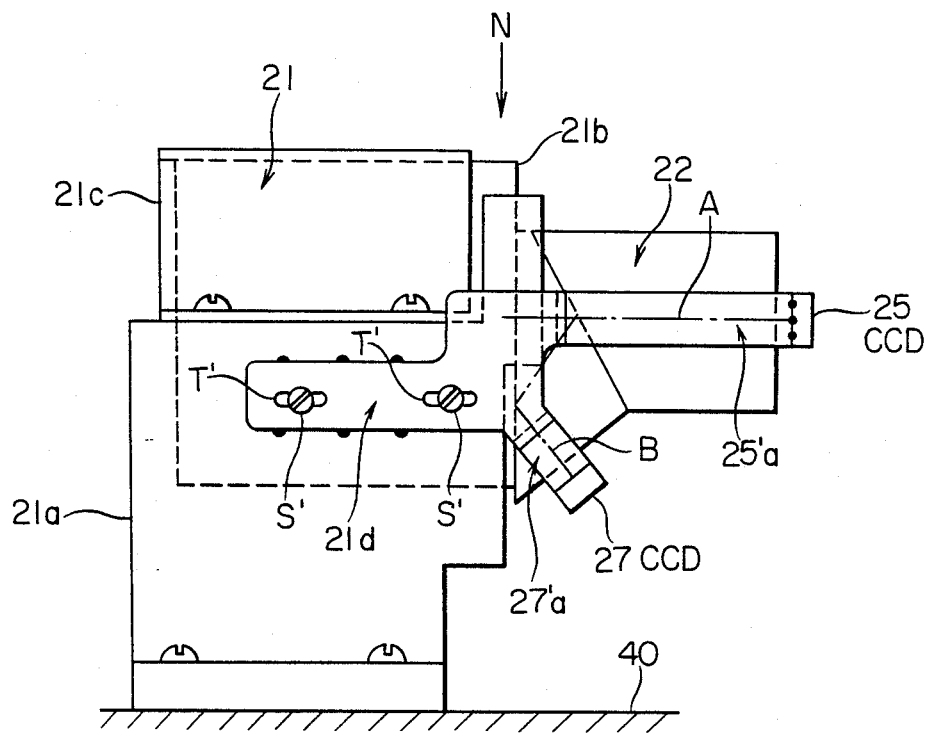
FIG. 11-B
VIEW FROM N
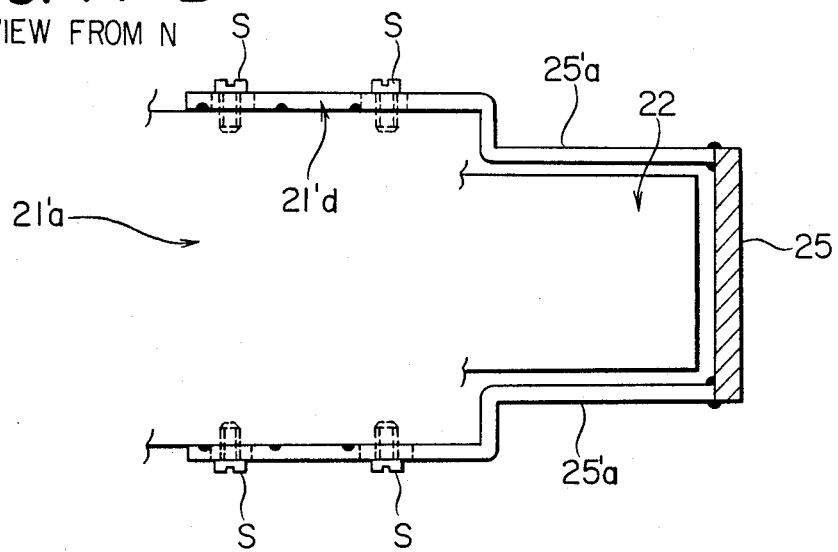

SOLID STATE IMAGE READING DEVICE WITH SENSORS ADHERED TO PLATE WHICH IS ADHERED TO LENS HOLDING MEMBER

BACKGROUND OF THE INVENTION

The present invention relates to an image reading device that reads images in an image-forming apparatus such as a facsimile, a copying machine and a printer and images in an image-pick-up device such as a telecamera and others, and more particularly to an image reading device provided with an image-reading unit wherein light images or optical images are read from a document illuminated by means of a solid image-pick-up element (or a solid state image sensor) such as CCD through an optical member such as a dichroic prism or the like.

For example, a color image forming apparatus, especially a color image forming apparatus in a digital system is composed generally of a color image processing device such as an image reading device and an image writing device. The image reading device, for example, separates light images obtained from the document by an exposure scanning, after causing them to pass through the image forming lens system for reading, into a plurality of light by means of a light separating means located behind the image forming lens system. In the case where images are formed on a line image sensor consisting of a solid image-pick-up element that receives light in each channel after separating into red (R) and cyan (C), for example, each line sensor needs to be mounted after the sufficient adjustment of the position and the perpendicularity for each spectral optical axis, so that light images from aforesaid lens system for reading may be formed correctly. Namely, when light images on each line image sensor are not corresponded correctly with each other, it adversely affects the reproduced images reproduced by the writing device. Since the solid image-pick-up element (e.g. line image sensor TCD 106C made by TOSHIBA) is so composed as to obtain an arrangement of picture elements each of which is about 7 $\mu$m in size, other colors appear as a fringe on the periphery of a reproduced image when the correspondence of the light image incidenting upon aforesaid image sensor in the example in FIG. 1 described later deviates over a quarter picture elements (approx. 2 $\mu$m), for example, a color ghosts in red, blue or other colors appear on the periphery of characters and figures in black. Especially when a deviation of 1 picture element (approx. 7 $\mu$m) or more takes place in aforesaid correspondence, the influence is remarkable. For preventing the color ghost, electric corrections have been generally made. However, when the most of color ghosts are intended to be prevented by means of an electric process, the capacity of memory for the process needs to be very large. And, image-wise problems that thickness of line image varies, for example, take place and it is not a perfect one because of the technical difficulties, which represents unsolved problems from the commercializing viewpoint.

The inventor of this invention has made a proposal through Japanese Patent Application No. 239174/1985, as to a means for preventing the deviation between picture elements of image sensors. In the proposal, each of solid image-pick-up elements 51a and 51b is fixed on each of base plates 52a and 52b to be a unit respectively as shown in FIG. 8, and they are capable of being adjusted, as shown in FIG. 7, both in directions to two axes of x and y orthogonalized each other spacially and in rotating directions around x and y axes, thus the units may be adjusted and fixed mechanically. Aforesaid proposal enables each solid image-pick-up element to be adjusted finely for fixing thereof and immediately after the adjustment, the correspondence between elements showed that they were mostly registered. As shown in FIG. 8, however, light-separating prism 54 that is an optical member and is provided behind the condenser lens 53 and solid image-pick-up elements 51a and 51b are mounted respectively on the frame and there are many holding members between them, such as the supporting units adjusted and fixed with adjusting screws which easily cause the deviation in positioning due to expansion or shrink depending on the temperature variation and the screws adjusted improperly and having their plays and errors, and it was not easy to solve the problems of the deviation of picture elements including the stability thereof. Especially when the solid image-pick-up element that is of a mechanical structure is held and fixed by means of precision screws, since a fine adjustment in the order of $\mu$m while applying the tightening force of aforesaid precision screws onto the solid image-pick-up element is necessary, it is very difficult to secure the precision. Further, even when the solid image-pick-up element is fixed fairly tightly by using the jig, it easily moves by several $\mu$m or more due to the restoration of the distortion upon releasing from the jig after tightening it with the torque for final setting by screws. And even when the image-pick-up element is set precisely within the accuracy of 1 $\mu$m, an occurrence of the deviation of several $\mu$m or more was observed in the impact test, due to the strain caused by stress in it's parts. Furthermore, the disadvantage of an occurrence of error caused by the coefficient of thermal expansion was observed after the temperature test.

Further, it has been proposed, for fixing the solid image-pick-up element, to fix it by the use of the adhesives in Japanese Utility Model Application O.P.I. No. 57670/1982. This proposal, however, relates to the fixing of a single solid image-pick-up element and it is not for the fixing to the optical member. It is for adjusting-/fixing the solid image-pick-up element to the frame and, in this fixing, an amount of the adjustment is compensated by filling the adhesives, therefore, it may not be applied to the image-reading apparatus having a plurality of image-pick-up elements that requires the high precision wherein no deviation for positioning is allowed.

SUMMARY OF THE INVENTION

In a color image processing apparatus, especially in a color image reading apparatus wherein a plurality of solid image-pick-up elements are arranged at the image-forming position of the device and images formed by each solid image-pick-up element are read and signals are processed, it is necessary that the reading device having a high resolving power is provided and the images formed by each solid image-pick-up element are precisely registered each other. An object of the invention is to provide a color image reading device wherein relative positional deviation among solid image-pick-up elements is prevented and images may be read stable under all conditions of temperature variation, change with the passage of time, vibration and impact.

Aforesaid object may be attained by an image reading device for reading light images by means of solid image-pick-up elements provided at the image-forming position of an optical system, wherein aforesaid solid image-pick-up elements are attached firmly to aforesaid optical member that forms a part of aforesaid optical system.

BRIEF DESCRIPTION OF THE DRAWINGS

FIGS. 2-A, 2-B, 3-A, 3-B, 6-A, 6-B, 9-A, 9-B, 9-C and 9-D are explanatory drawings showing examples of how solid image-pick-up elements are attached firmly to the color image reading device in the invention. and FIG. 4-A and 4-B are perspective views showing the combination of a lens barrel and prisms.

FIGS. 10-A, 10-B, 11-A, 1-B, 12, 13, 14, 15, 17, 18, 19-A and 19-B are explanatory drawing showing various embodiments having a position adjusting means for setting CCD precisely onto an optical separating means.

DETAILED DESCRIPTION OF THE INVENTION

Figure 1:
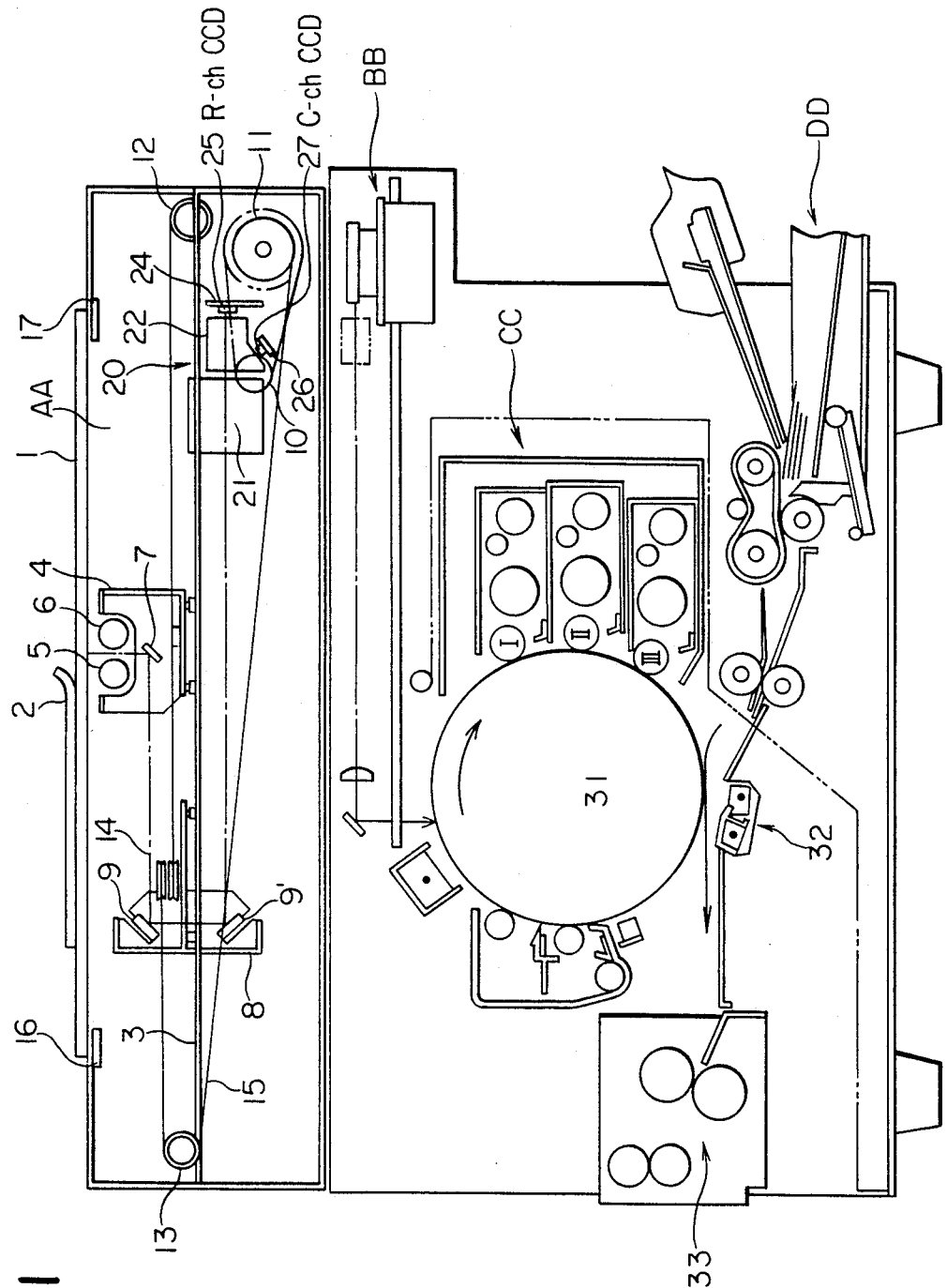
FIG. 1 is a schematic diagram to a color image-forming apparatus provided with a color image reading device of the invention.

The image-forming apparatus provided with a color image reading device of the present invention will be explained as follows, referring to FIG. 1. In the figure, AA represents an image reading device having therein a reading unit, BB, a writing unit, CC, an image-forming unit that constitutes an color image processing apparatus and DD is a paper feed unit.

In the image reading device, numeral 1 represents a platen glass and document 2 is placed on the platen glass 1. The document 2 is illuminated by fluorescent lamps 5 and 6 provided on a carriage that travels on the slide rail 3. Being provided with mirrors 9 and 9', the movable mirror unit 8 travels on the rail 3 and guides the light image of the document 2 placed on platen glass 1 to the lens reading unit 20, cooperating with first mirror 7 provided on carriage 4.

Carriage 4 and movable mirror unit 8 are driven in the same direction at the speed of V and ½ V respectively by pulleys 11, 12, 13 and 14 driven by the stepping motor 10 through the wire 15. Reference white plates 16 and 17 are provided on reverse side at both edges of platen glass 1 and it is so constituted that reference white color signals are obtained before the start of scanning for reading document and after the completion of the scanning.

The lens reading unit 20 is composed of lens 21 as a lens system for reading, prism 22 as a color-separating means, red channel (hereinafter referred to as R-ch) CCD 25 as a line image sensor and cyan channel (hereinafter referred to as C-ch) CCD 27 as also a line image sensor. Light image from the document transmitted through the first mirror 7, mirror 9 and mirror 9' is converged by the lens 21, separated by the dychroic mirror provided in the prism 22 into R-ch image and C-ch image, and each light image is formed respectively on the light-receiving surfaces of R-ch CCD 25 and C-ch CCD 27 fixed on the prism 22 through the attaching members 24 and 26.

As aforesaid fluorescent lamps 5 and 6, warm white type fluorescent lamps on the market are used for the purpose of preventing the enhancement and attenuation of a particular color caused, during reading the document, by the light source and they are lit by the high frequency power source of 40 KHz for preventing their flickering and further they are warmed by the heater employing therein a posistor for keeping the tube wall at the constant temperature or for accelerating the warm-up.

Image signals outputted from aforesaid R-ch CCD 25 and C-ch CCD 27 are processed through the unillustrated signal processing means and color signals separated to be corresponded with toner colors are outputted and then inputted in the writing unit BB. Then, image-wise exposing beam by means of each laser beam generated from the semiconductor laser is projected in succession onto the surface of photoreceptor drum 31 and developed for each projection by each of developing rollers I, II and III, thus the color image is formed with 3-color toners.

Then, the color image on the surface of aforesaid photoreceptor drum 31 is transferred, at the transfer-separating electrode 32, onto a copying paper transported from paper feed means DD and the copying paper is separated and is conveyed through the fixing unit 3 to be delivered from the apparatus, thus the reproduction of a color image is completed.

FIG. 2-a and 3-a represent the first and second examples of image reading device according the invention.

The structure of lens reading unit 20 in aforesaid reading device AA, namely, aforesaid lens barrel 21, prism 22 are fixed and held by following common means.

Aforesaid lens barrel 21 is rested in the V-shaped receiving portion that opens at right angles toward the upper part of holding member 21a, fixed with clamping metal fittings 21c and then is mounted at a prescribed position on the base board 40 as shown in these Figures.

In the present invention, the rear side of aforesaid holding member 21a is provided with attaching surface 21b with where the front surface of aforesaid prism 22 can be fixed by bonding manner with adhesives.

Since aforesaid attaching surface 21b may be formed through a machining, it's distance from image-forming lens being accommodated in the lens barrel 21 and it's perpendicularity to the optical axis are very high in accuracy, thus the prescribed light images may be formed correctly on the light-receiving surface of aforesaid R-ch CCD25 and C-ch CCD27 through prism 22 attached on the attaching surface 21b.

An influence of errors in the fitting angles R and R', as shown in FIG. 4-a, of plane 22b of the prism 22 which is to be attached to the plane 21b of the lens barrel 21 in the way of being at right angle vertical and horizontal to the optical axis of lens can be examined by resolving power (MTF: Modulation Transfer Function) capable of being obtained by using single outputs of black stripe and white stripe against white region as shown in FIG. 5.

Figure 5:
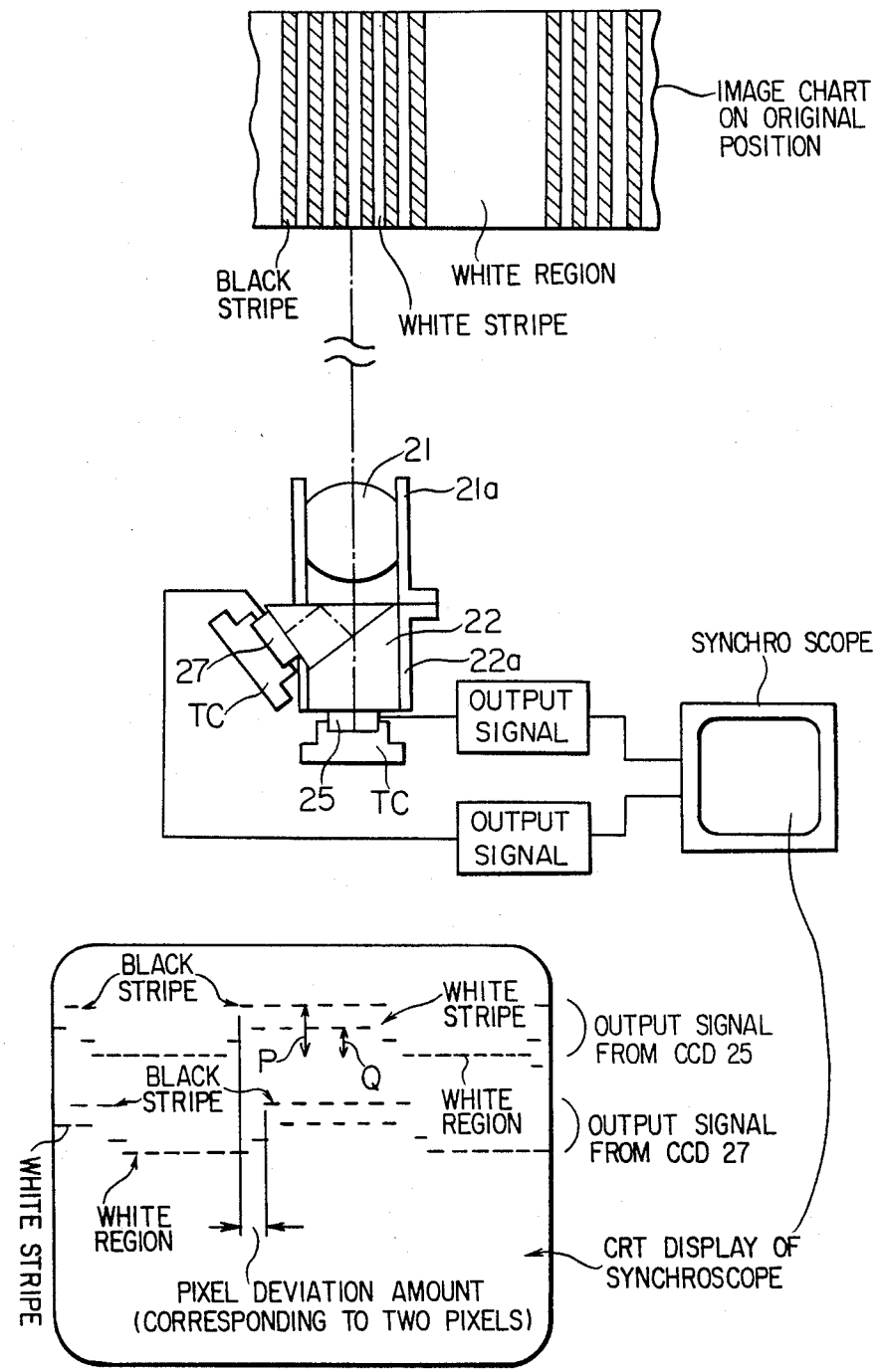
FIG. 5 is an explanatory diagram showing the way of adjusting a solid image-pick-up element of the invention.

FIG. 5 indicates a checking method for pixel deviations between CCD25 and CCD27, the detailed explanation about the method will be mentioned later.

As indicated on the CRT display in FIG. 5, assuming the signal levels of the black stripe and the white stripe against the white region as being P and Q, the resolving power (MTF) can be obtained by following formula.

$$(MTF) = (P-Q) \times (P+Q) \times 100 \ (\%).$$

Higher the value of MTF is, higher resolution the displayed image can be obtained.

Now, assuming the value of MTF being 30% and then taking one example of the influence of errors in the fitting angle against the MTF (30%);

when the errors deviating from right angle is 1/6 degree in angle, the MTF value may be lowered to 21% being reduced 9%, and when the errors further deviates to about 0.5 degree, the MTF value may be lowered to 15% being reduced to the half value thereof.

Since the above errors causes the resolving power to be lowered remarkably, thereby further causing troubles in taking out black/white judging signals, therefore, it is important to maintain the surface accuracy.

Fixing the lens barrel 21 and prism 22 to be one body in advance for the purpose of maintaining the surface accuracy prevents the drop of yield in the later step of production, offers the advantage in cost and reduces the adverse influence on the deviation of picture elements after attaching CCD caused by the material of holding member 21a and attaching member 24 for the further effect.

For sticking the prism 22 on aforesaid lens barrel 21, the adhesives which stand the test of adhesive strength and various kinds of environmental tests are selected for use. In the present example, however, the same adhesive can be used for sticking CCDs 25 and 27 on the prism 22 stated later, therefore, the characteristics of the adhesive will be explained totally in the item which illustrates the way of attaching and fixing aforesaid CCDs 25 and 27.

As a method of fixing in place of the above method of bonding, the rear side of the holding member 21a is provided with an attaching surface 21b where the front surface of the prism 22 can be pushed in, and the prism 22 held by a holding member 22a can be pressed and fixed by means of screw-setting with set screws 80 as shown FIG. 4-b.

Next, how CCD 25 and CCD 27 are attached and fixed will be explained. In the first example, supporting section 21d whose one portion is extended to the side of prism 22 is arranged on aforesaid holding member 21a as shown in FIG. 2-A. The supporting sections 21d are arranged symmetrically at both sides of prism 22 so that they do not touch the prism 22 but cover the both sides of it. On the other hand, a pair of attaching members 25a or 27a are glued and fixed on both edges of each of aforesaid CCD 25 and CCD 27 respectively in advance, and attaching members 25a and 27a are positioned against the exit faces of prism 22 precisely through the method wherein attaching members 25a and 27a are adjusted positionally and glued and fixed to outer sides of aforesaid supporting section 21d.

In the second example, holding member 21'a that holds lens barrel 21 is cut at the position corresponding the rear edge of the lens barrel 21 as shown in FIG. 3. In this structure, however, attaching members 21'd each of which is provided with protrusions 25'a and 27'a both extending to each exit face of prism 22 may be glued on both sides of the holding member 21'a. Incidentally, an arrangement is made so that a pair of aforesaid attaching members 21'd shaped symmetrically are attached.

In the present example, as in the first example, aforesaid protrusions 25'a and 27'a of aforesaid attaching member 21'd are glued and fixed on both ends of CCD 25 and CCD 27 in advance, the attaching member 21'd is adjusted positionally before being glued on to the holding member 21'a and then fixed.

Further, aforesaid attaching members 25a, 27a or 21'd may hold, after the partial modification thereof, a solid image pickup element at its one side as is shown in FIG. 6 (a), for example, and it is further possible that a solid image pickup element is held between opposing attaching members if plural bolts B and nuts N are arranged as shown in FIG. 6 (b) so that they can press opposingly by tightening.

As a material of an attaching member, the material whose coefficient of linear expansion is small is preferable for two reasons. One reason is to cause the deviation of picture elements resulted from the temperature variation not to be created and the other reason is to prevent the phenomenon wherein the internal strain is created in the attaching member glued on the prism due to the difference of the coefficient of linear expansion between the attaching member and the prism and thereby the crack or the like is produced in the prism. Aforesaid problem of the deviation of picture elements between CCDs caused by the temperature variation may be reduced by causing the condition for fixing each CCD on the attaching member to be exactly the same each other, but the coefficient of linear expansion further needs to be small. Since the coefficient of linear expansion of a prism is usually as small as about $7.4 \times 10^{-6}$ (optical glass BK - 7), as the attaching member, glass, ceramic material ($7.0-8.4 \ 8.4 \times 10^{-6}$), low thermal expansion alloy [e.g. Invar alloy ($1-3 \times 10^{-6}$) and Ni-resist cast iron ($4-10 \times 10^{-6}$)] are preferable and aluminum material is not so suitable. Inventors of the present invention made tests for various materials as an attaching member and observed no detectable deviation of images caused by the thermal expansion when glass materials, other ceramic materials and low thermal expansion alloy were used.

In the above-mentioned example, adhesives were used for the fixing between prism and attaching member and between attaching member and CCD and fixing by means of adhesives was made in FIGS. 2 and 3 after the positional adjustment of each CCD for separated light images. Especially in FIG. 2, no deviation of picture elements was observed in such a constitution despite iron whose coefficient of linear expansion is high ($12 \times 10^{-6}$) used as an attaching member because the dimension in 'a' direction is short and thermal expansion has little influence, 'b' direction is one for arranging line sensors in a row and further the material of prism, and the material of package for line sensors are ceramic material, thereby their coefficients of linear expansion are mostly the same.

Using various types of adhesives available, the inventors of the invention made comparative studies. As a result, it was concluded that 2-liquid type adhesives and light-hardenable adhesives are preferable and ultraviolet ray-hardenable adhesive is most preferable.

As adhesives to be used, epoxy type adhesives and acryl type adhesives are available and they are further divided into 1-liquid type adhesives and 2-liquid type adhesives. In 1-liquid type adhesives, hardening agents are usually mixed thereto in manufacturing process therefor and when they are used, they are gradually hardened and dried for solidification as they are exposed to air, and a special instrument for glueing and fixing is needed for the reasons such as a hardening time is long and the shrinkage during hardening are irregular. Therefore, 1-liquid type adhesives are considered to be unsuitable from the viewpoint of the purpose of application of the invention and the productivity of the adhesives. In this connection, in case of 2-liquid type adhesives of a quick acting type, it is possible to shorten the hardening time to about a few minutes by mixing and kneading hardeners and primary agents when glueing and to stabilize the extent of hardening, thus it conforms effectively to the object of the invention. Incidentally, 1-liquid type cyanoacrylate adhesives of a quick acting type is available, but the tear of adhesion takes place in the glued portion when it is exposed to the impact and deformation of glued objects takes place being caused by the shrinkage of adhesives that is created when adhesives are dried, thus, it is considered to be unsuitable for the invention. The inventors of the invention used HARD-ROCK E510K (brand name) as 2-liquid type adhesives and conducted glueing under the room temperature and obtained the results which were satisfactory for the environmental tests that will be stated later. Incidentally, during aforesaid glueing, attempts were made to shorten the glueing time by changing remarkably the temperature conditions. As a result of the attempts, the deviation of picture elements was observed slightly during glueing. which proved to be undesirable.

Contrary to the foregoing, it is possible to shorten the hardening time of adhesives by a simple method of adjusting the intensity of the light for the light-hardenable adhesives, and it is possible to improve the workability, to reduce the cost and to stabilize the quality of products. Among light-hardenable adhesives. ultraviolet-hardenable adhesives, in particular, hardly cause the temperature fluctuation therein even when they are subjected to the illumination by ultraviolet rays, thus, the effects thereof are stable. As light-hardenable adhesives, the inventors of the invention used adhesives of Three-Bond TB3060B (brand name), Denka1045K (brand name) and Noland65 (brand name) and conducted glueing in a short time under the ultraviolet-illumination by means of a high pressure mercury lamp and obtained the results satisfactory for the environmental tests described later. Further, the adhesives of a ultra-violet-hardenable type such as Three-Bond3062B (brand name) and LT350 (brand name) were used and it was cleared that they are more effective for the moisture resistance and they ensure the adhesion that guarantees the strength. In the adhesion method wherein aforesaid adhesives are used, opposing surfaces of objects to be glued are pressed each other and a small amount of adhesives are injected through a proper injecting means into aforesaid opposing surfaces from the side of the pressed opposing surfaces. Since aforesaid adhesives have their fluidity, they flow into the small clearance formed between the opposing surfaces, and stick the objects to be glued firmly. As a glueing method, adhesives may be injected to flow into the clearance so that entire area of opposing surfaces are glued. Further, optimum intervals may be provided for the injection of adhesives. Further, when a device capable of positioning accurately the objects to be glued is used, adhesives may be applied on the glueing surface of each object to be glued in a form of a dot or area in advance, and then the glueing surfaces of the objects to be glued may be pressed each other immediately for adhesion.

A fixing jig TC according to the invention is to be prepared for glueing CCD25 and CCD27 to the prism 22.

Figure 7:
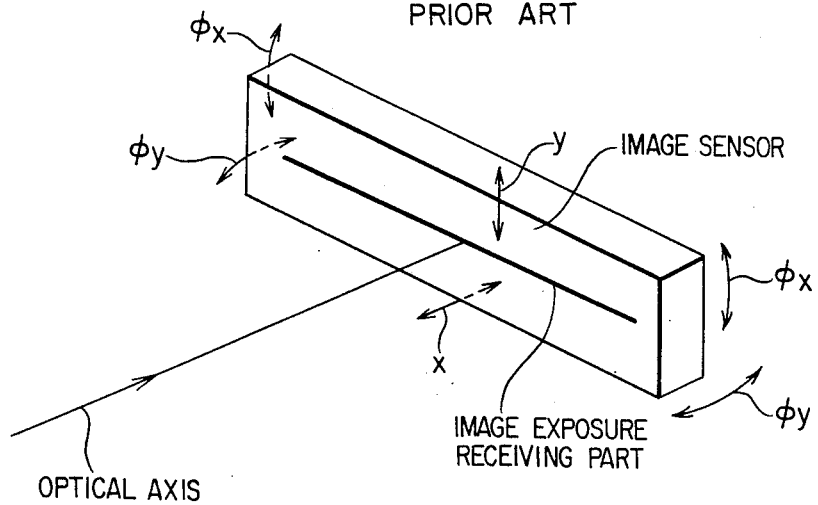
FIG. 7 represents a perspective view showing how the image sensor is adjusted.

Aforesaid fixing jig capable of holding the sides of CCD25 and CCD27 provides easy adjustment of the CCDs with respect to the optical axes, such as two directions of x and y which are axial and perpendicular to the optical axes respectively and rotating directions around x and y axes as shown in FIG. 7, relating to each optical axis of separated light A and B as shown in FIG. 5. Through the fine adjustment on the fixing jig TC, an adjustment for preventing the deviation of picture elements may be made.

A precise positioning of each of plural CCDs for assuring their relational positions which is one of the objects of the invention is attained by using, as an attaching jig, a positioning tool (made by CHUO SEIKI CO., LTD.) wherein an adjusting table is movable in the directions of three axes (X,Y and 2) and is further rotatable round each of the axes.

Chart images of black and white stripes placed at the document position are to be formed on CCD25 and CCD27 respectively and output signals therefrom are recorded on a synchroscope in a juxtapose mode. When a chart is prepared by means of the designed reduction ratio by the condenser lens 21 and the size of picture element of CCD so that a line of the stripes corresponds to one picture element, it is possible to read easily an amount of deviation of picture elements from recorded signals superposed side by side on the synchroscope. For example, the CRT surface of a synchroscope shown in FIG. 5 exemplifies the condition wherein the deviation of picture elements takes place between CCD25 and CCD27. Further, it is possible to obtain the relational position between CCDs that does not cause any deviation of picture elements by adjusting the fixing jig TC while checking through the synchroscope, and CCD25 and CCD27 are to be fixed on holding member 21a, as one example indicated in FIG. 2-A, at the image-forming position through the attaching member 25a (27a), keeping aforesaid relational position.

Figure 8:
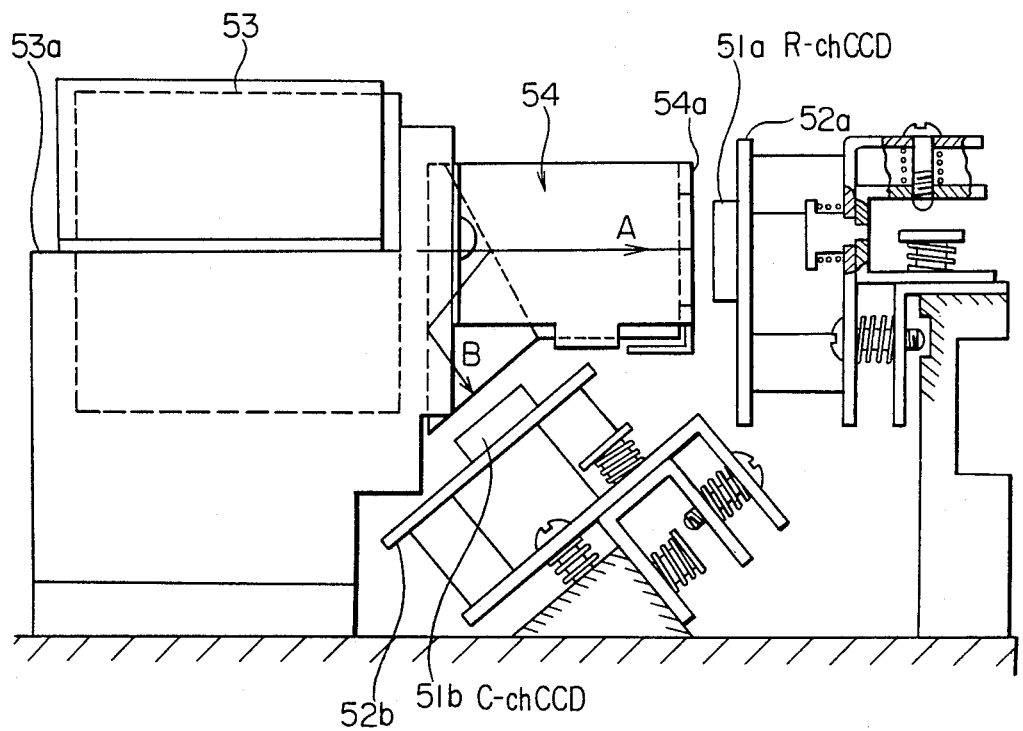
FIG. 8 is a sectional view showing the mechanism for attaching a conventional line image sensor.

Various comparative tests were made pertaining to the image-reading unit wherein a plurality of solid image-pick-up elements are fixed, through the attaching member employing ceramic materials, on the prism that is an optical member by the use of adhesives corresponding to FIGS. 2 and 3 and to the image-reading unit wherein solid image-forming elements are retained by means of the mechanical constitution shown in FIG. 8. Tests were made, paying attention especially to the deviation of picture elements, in the way wherein a stripe chart was placed at the position for document and output signals from a plurality of solid image-pick-up elements provided were superposed on a synchroscope and compared.

(1) Vibration test

Vibration tests with variable frequency were made for 30 minutes and the conditions of the deviation of picture elements before and after the vibration tests were compared. Some of those having the mechanical structure corresponding to FIG. 8 showed a phenomenon wherein screws were loosened and the deviation of picture elements equivalent to about 4 picture elements (30 μm) took place. Deviation of picture elements was hardly observed on the one in the present example according to the invention.

(2) Impact test

Drop tests under 40G were made and the conditions of deviation of picture elements before and after the tests were compared. Some of those having the mechanical structure showed the deviation of picture elements equivalent to about 3 picture elements (20 μm). Deviation of picture elements was hardly observed on the one in the present example.

(3) Temperature test

Conditions for the deviation of picture elements were compared for 2 hours while raising the environmental temperature from 20° C. to 70° C. Some of those having the mechanical structure showed the deviation of picture elements equivalent to about 4 picture elements (30 μm). Then, the environmental temperature was restored from 70° C. to 20° C. during the period of 2 hours. Even after the restoration of the environmental temperature to 20° C., the residual deviation of picture elements equivalent to about 2 picture elements (15 μm) was observed on some of those having the mechanical structure. On the other hand, no deviation of picture elements was observed constantly on the one in the present example.

In the aforesaid example, CCD 25 and CCD 27 are glued and fixed on the holding member 21a through attaching members 25a, 27a or 21'd and it is also naturally possible to glue and directly fix on the light-separating member in place of the holding member 21a.

Incidentally, when maintenance work is required due to troubles on CCD for some reasons as well as misarrangement on manufacturing process, all unit constructed integrally by gluing and fixing the CCD on the optical (light) separating member may be threw away. The invention allow to replace only the CCD and the attaching member so that the lens and the light separating member, which are rather expensive, can be used again. From this point of view, it is preferable to attach CCD on the inexpensive holding member rather than on the expensive light-separating member.

In the present invention, a holding member is not limited only to the holding member used in aforesaid example some modification may be allowed corresponding to a figure of optical means. For, example CCD may be attached, through attaching member 21'd, on the clamping metallic fixture 21c that holds lens barrel 21 above the holding member 21a as shown in FIG. 9-A, or it may be attached, as shown in FIG. 9-B, on the rear position of the lens barrel.

Further, when attaching the light-separating member, through the attaching member 22a, on the attaching portion 21b for the lens barrel using setscrews 80 as shown in FIG. 4-B, the CCD may be attached on the attaching portion 21b through the attaching member 21'd as sown in FIG. 9-C. By the way, in the case of attaching the attaching member 21'd on the attaching portion 21b, it may be possible to use a secondary attaching member such as L-shaped fixture to make attaching work easy. Further, the CCD may be attached, as shown in FIG. 9-D, on the attaching member 22a that is for the light-separating member.

From the view of reuse in the maintenance work, the embodiment showed in FIG. 9-D may be preferred.

Next, a positional adjustment method for the attaching members to be used for attaching a solid image pickup element on a holding member or on a supporting member will be explained. FIG. 10-a shows an example wherein slots T and screw members S are provided to the example shown in FIG. 2 as a positional adjustment device.

In FIGS. 10-a and 10-b, attaching members 25a or 27a are glued and fixed, in advance, on both edges of each of CCD 25 and CCD 27 which are mounted on aforesaid supporting section 21d through the attaching members 25a and 27a. In the procedure of mounting CCDs, the CCDs are provisionally fixed by means of the screw members S screwed in the supporting section 21d through the slots T, and then aforesaid attaching members 25a and 27a are moved along with the slots T in the direction perpendicular to the exit face of aforesaid prism 22 for the positional adjustment. After CCDs are correctly set on the exit faces of aforesaid prism 22, aforesaid screw members S are tightened and gluing is further made, the CCDs are fixed on aforesaid holding member 21a.

FIGS. 11-a and 11-b show an example wherein a positional adjustment device is provided in the example shown in FIG. 3. In this example, as in the example shown in FIGS. 10-a and 10-b, aforesaid CCDs are mounted on aforesaid holding member 21'a after they are glued and fixed on protrusions 25'a and 27'a of aforesaid attaching member 21'd. In the mounting procedure, CCDs are provisionally fixed through two slots T' by means of screw members S' screwed in aforesaid attaching surface and then aforesaid CCDs 25 and 27 are moved along the slots T' in the direction perpendicular to the exit face for the positional adjustment. After CCDs are correctly set to the exit faces of aforesaid prism 22, aforesaid screw members S' are tightened and gluing is further made, thus CCDs are fixed on aforesaid holding member 21'a.

Figure 12:
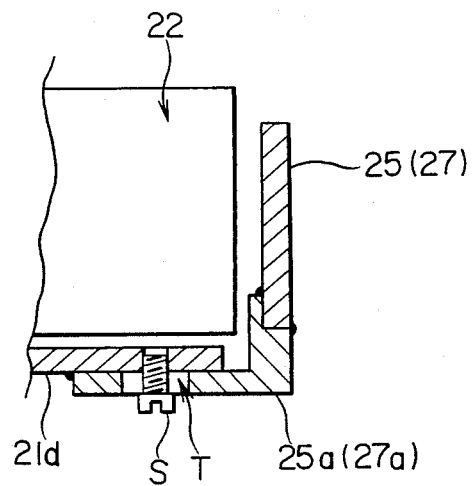

Further, aforesaid attaching members 25a, 27a or 21'd are able to hold, with a partial shape modification thereof, a solid image pickup element at its one end as shown in FIG. 6 (a) and FIG. 12 shows an example wherein a positional adjustment device is provided in the example in FIG. 6 (a).

Though a single unit is exemplified in FIGS. 10, 11 and 12 as an attaching member having aforesaid adjustment device, an attaching member may naturally be consisted of plural units.

Figure 13:
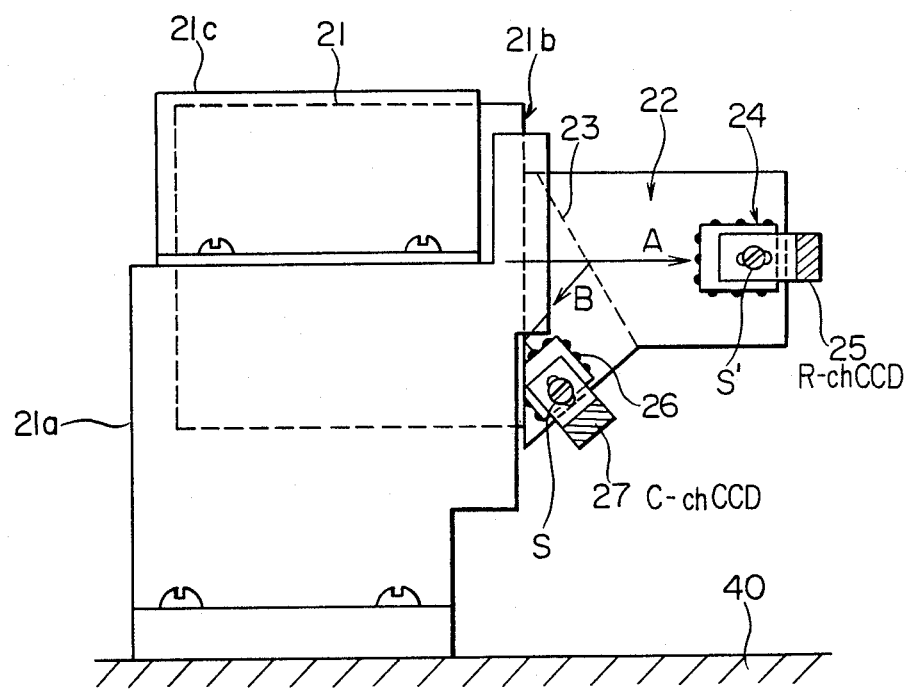
Figure 14:
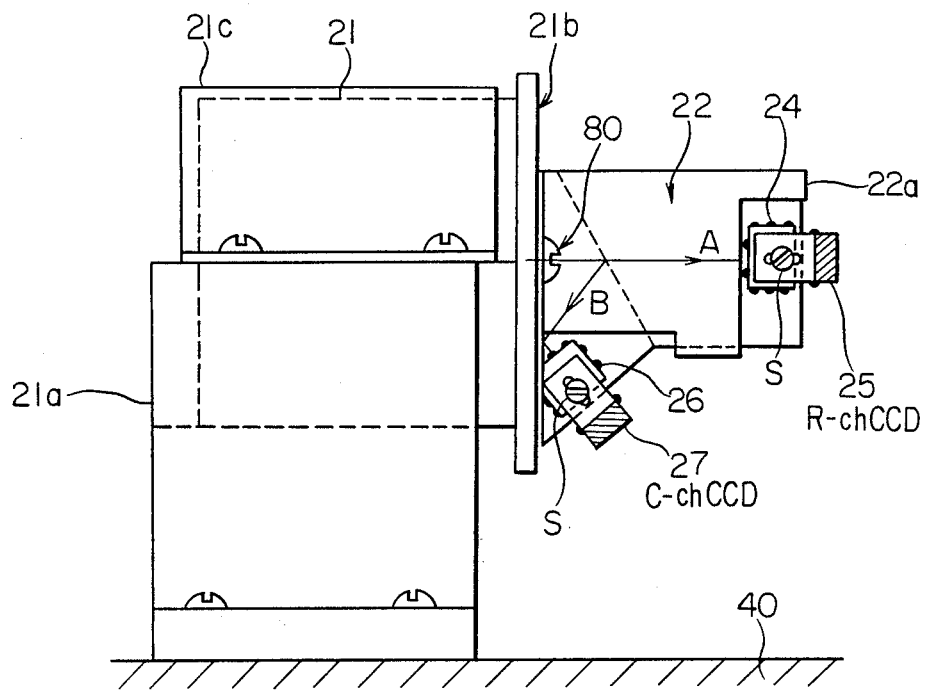
Figure 15:
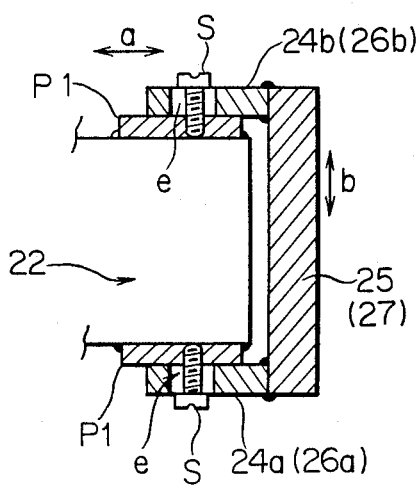

Next, an example wherein a solid image pickup element is attached on light-separating member through a positional adjustment device will be explained. FIG. 13 shows an example wherein a positional adjustment device is employed for the prism that is fixed through the method shown in FIG. 4-a and FIG. 14 shows an example wherein a positional adjustment device is employed for the prism fixed through the method shown in FIG. 4-b. Namely, aforesaid CCDs 25 and 27 are capable of being attached on the prism 22 through attaching members 24 and 26 as shown in FIGS. 13 and 14 and the attaching members 24 and 26 employed in the reading device of the present example are capable of being fixed after the position adjustment that each CCD held by them by means of gluing is positioned, for the adjustment thereof, by moving it freely in the direction of an optical axis of a light image to be received by the CCD. Through such an adjustment operation, it is possible to position precisely the receptor face of each CCD mentioned above at the image-forming position of a light image. FIG. 15 shows the constitution of aforesaid attaching members 24 (26) wherein a pair of fixing plates P1 having thereon screw holes are glued and fixed in advance to the symmetrical positions on both sides of the prism 22 and movable plates 24a (26a) and 24b (26b) holding CCDs 25 (27) by means of gluing at their both edges are arranged outside of the fixing plates P1 so that the movable plates can move and slide. Each of aforesaid movable plates 24a (26a) and 24b (26b) is provided with slots e which are formed in the direction of spectral optical axes A and B of the prism 22 and a pair of screws s are engaged in the screw holes on aforesaid fixing plates P1 through the slots e on both sides, thus each CCD can be fixed to be united with the prism 22 when aforesaid screws s are tightened.

Namely, each CCD is provisionally fixed to prism 22 and then finally fixed and united with the prism 22 when aforesaid screws s are tightened after aforesaid each movable plate is positioned, for the positional adjustment, by being moved in the direction of the optical axis. Further it is also possible to strengthen the fixation between the movable plate and the fixing plate by means of the gluing between them.

Figure 16:
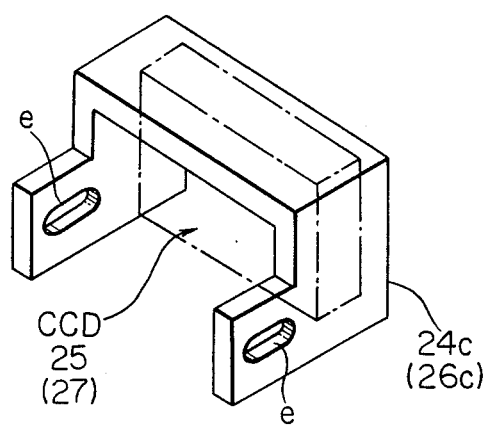
FIG. 16 is a perspective view showing an attaching member having slote for positioning.

FIG. 16 shows a movable member wherein aforesaid movable plates 24a, 24b (26a, 26b) mounted symmetrically on both sides of the prism 22 are united to be one unit, and inside the bridge-shaped movable member 24c (26c), the CCD 25 (27) is glued in advance and the movable member is fixed on aforesaid fixing plate P1 by means of a pair of screws s through the slots e after the positional adjustment is made as in the case of FIG. 15.

In aforesaid example, CCD 25 (27) is fixed on the attaching member at both arm-shaped edges thereof, and as described above, one of plural gluing edges on CCD may surely be glued but other gluing edges may not necessarily be glued. Therefore, it is a preferable method from the viewpoint of close adhesion or gluing that one attaching member is used for one edge for gluing.

Figure 17:
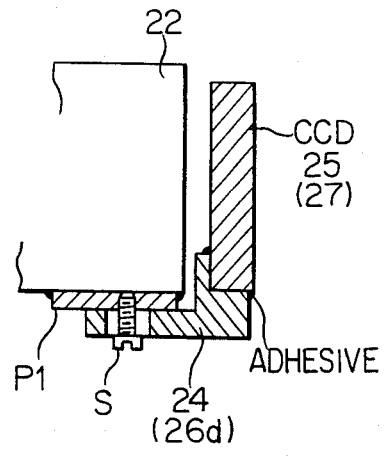

FIG. 17 shows an example for adjusting positionally and fixing the CCD by means of a cantilever movable plate, wherein the movable plate 24d (26d) to which the CCD is glued in advance is adjusted positionally and fixed on the fixing plate P1 that is glued and fixed on one side of the prism 22.

Figure 18:
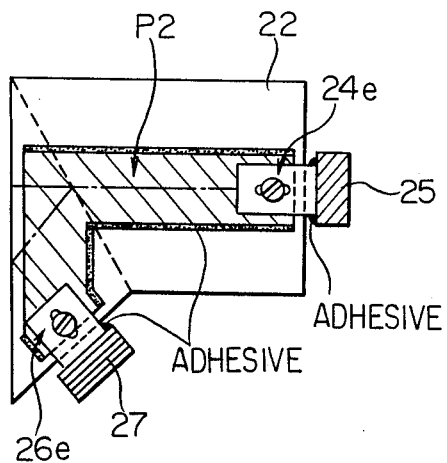

In the aforesaid example, each CCD is positioned and fixed at the image-forming position by means of each corresponding fixing plate, while FIG. 18 shows an example wherein a common fixing plate P2 is used and movable plates 24e(26e) onto which CCD 25 and CCD 27 are glued and fixed is adjusted positionally and fixed on the fixing plate P2 that is glued and fixed on the prism 22.

Figure 19A:
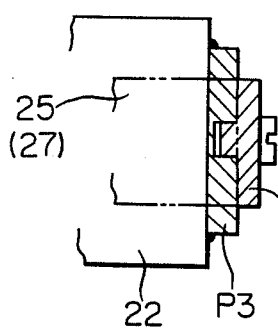
Figure 19B:
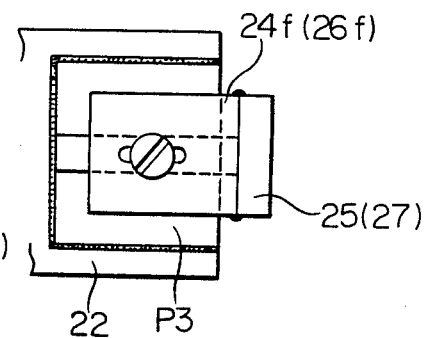

As is obvious from the above explanation, in the present invention, CCDs are attached on the prism through an attaching member consisting of a fixing plate and a movable plate. When aforesaid fixing plate and movable plate are arranged so that they may be slided in the direction of the spectral optical axis for the positional adjustment by means of a groove engagement as shown in FIG. 19, each CCD fixed on the movable plate may be moved with its receptor face which is constantly kept to be perpendicular and centered to the optical axis, thus it is very easy to adjust positionally the CCD to the image-forming position.

When the light-separation member which is an optical member and a solid image-pick-up element are fixed at the image-forming position through a simple attaching member as in the case of the present invention, many causes for the deviation of picture elements are removed, thus, clear and excellent images are reproduced and obtained through the color image reading device and the deterioration of image quality caused by the deviation of picture elements under the environmental change and the passage of time does not take place, thereby the circuit for complicated electric compensation for the correction of aforesaid deviation of picture elements and of color ghost is not necessary and excellent durability may be ensured.

As explained in the example, the present invention employs a method of filling adhesives which is similar to the close adhesion method. Compared with ordinary methods for filling adhesives, therefore, no shrinkage caused by drying adhesives takes place and image-reading which is extremely high both in accuracy and stability is carried out. When the lens barrel portion and the prism are united to be one body in advance, it serves for the cost reduction and higher stability of the device and it further prevents the pixel slip that may occur after the CCD has been fixed.

What is claimed is:

1. An image reading device for photoelectrically reading a color image light, comprising:
   (1) a lens;
   (2) a lens holding member for holding said lens;
   (3) an optical separation means for separating said color image light introduced by said lens into a plurality of color component lights wherein said optical separation means has an incident surface and a projection surface whereby said incident surface of said optical separation means is attached to one surface of said lens and said projection surface of said optical separation means is perpendicular to an optical axis thereof;
   (4) a plate member having two ends wherein a first end of said plate member is attached to said lens holding member with an adhesive and a second end of said plate member extends beyond said projection surface of said optical separating means wherein a thermal expansion coefficient of said plate member is substantially equal to that of said optical separation means; and
   (5) an image reading means for converting said plurality of color component lights to electric signals wherein said image reading means is attached to said second end of said plate member with an adhesive.

2. The image reading device of claim 1 further comprising a supporting member to support said lens thereon wherein said supporting member is of ceramic material.

3. The image reading device of claim 1, wherein said plate member is a ceramic material.

4. The image reading device of claim 1, wherein said plate member gas a position adjusting means.

5. The image reading device of claim 4 wherein said position adjusting means comprises two members whereby one of said members is movable relative to the other.

6. The image reading device of claim 5, wherein the first member of said two members has a elongated through hole therein and the second member has a guide pin so that the relative movement between both members is guided by both said elongated through hole and said guide pin.

7. The image reading device of claim 6, wherein said guide pin is a screw member.

8. The image reading device of claim 5, wherein the first member of said two members has a elongated groove therein and the second member has a guide pin so that the relative movement between both members is guided by both said elongated groove and said guide pin.

9. The image reading device of claim 5, wherein said two members are fixed with each other by using an adhesive after the position adjusting is completed.

* * * * *